United States Patent [19]
Lang et al.

[11] Patent Number: 4,901,140
[45] Date of Patent: Feb. 13, 1990

[54] SOLID STATE 360 DEGREE VIEWING SYSTEM HAVING A LIQUID CRYSTAL DISPLAY (LCD) SCREEN THAT ENCIRCLES THE ROTATING REAL IMAGE IN SPACE AND FUNCTIONS AS A MULTI-COLOR FILTER SYSTEM

[75] Inventors: Paul W. Lang; Franklin C. Gribshaw, Orange, Calif.

[73] Assignees: Gold Stake, Pasadena; C. Allen Jensen; Gregory D. Levy, both of Orange, all of Calif.

[21] Appl. No.: 326,173

[22] Filed: Mar. 17, 1989

Related U.S. Application Data

[63] Continuation-in-part of Ser. No. 320,289, Mar. 7, 1989.

[51] Int. Cl.[4] ............................................. H04N 9/16
[52] U.S. Cl. ......................................... 358/64; 358/87; 358/56; 350/331 R
[58] Field of Search ...................... 358/64, 56, 58, 59, 358/87; 350/130, 144, 273, 274, 331 R, 334

[56] References Cited
U.S. PATENT DOCUMENTS 3,335,217  8/1967  Bassett .
3,647,284  3/1972  Elings et al. .
3,976,837  8/1976  Lang .
4,100,571  7/1978  Dykes et al. ........................ 358/87
4,656,506  4/1987  Ritchey ............................... 358/60

Primary Examiner—Howard W. Britton
Assistant Examiner—Kim Yen Vu
Attorney, Agent, or Firm—Kelly, Bauersfeld & Lowry

[57] ABSTRACT

A viewing system is provided for presenting a real image in space that is rotated extremely rapidly so that an entire audience, regardless of an individual's position about the viewing system, can view the same image substantially simultaneously and continuously. An electronic image rotation system distorts, processes and rotates a black and white image upon a cathode ray tube (CRT), and a parabolic mirror arrangement projects the image from the CRT to provide a rotating real image in space. A liquid crystal display (LCD) screen is utilized to define a filtered viewing window which is continuously redefined at sequential intervals to remain continually aligned with the rotating real image in space. The LCD screen includes normally opaque red, green and blue filter panels which operate to give color to the real image in space.

83 Claims, 3 Drawing Sheets

SOLID STATE 360 DEGREE VIEWING SYSTEM HAVING A LIQUID CRYSTAL DISPLAY (LCD) SCREEN THAT ENCIRCLES THE ROTATING REAL IMAGE IN SPACE AND FUNCTIONS AS A MULTI-COLOR FILTER SYSTEM

RELATED APPLICATION

This application is a continuation-in-part of application Ser. No. 320,289, filed Mar. 7, 1989, and entitled 360° VIEWING SYSTEM.

BACKGROUND OF THE INVENTION

This invention relates to image projection and television viewing systems. More particularly, this invention relates to a method and apparatus for enabling a centrally located televised picture to be viewed substantially simultaneously by an audience surrounding the picture over 360°.

The general problem in the display of a picture print, a television image or a projection onto a screen is that the picture is best viewed when the viewer's line of sight is precisely normal to the plane of the picture. This ideal condition is difficult to realize when several people wish to view the picture simultaneously from varied locations.

One solution to this problem is to simply mount the picture on a rotating pedestal which will slowly rotate over 360°, permitting several people surrounding the pedestal to eventually view the picture in a line of sight normal to the plane of the picture. Such systems are often used in advertising displays in large areas such as railroad stations and the like. A problem with this arrangement is the fact that the rotation of the picture must be relatively slow in order to permit the various viewers to have an opportunity to study the picture. Such a slow rotation means that essentially only a few people at a time are viewing the picture while others out of the line of sight must wait until the picture comes into view.

There are many instances in which a plurality of people may wish to view a picture or displayed data simultaneously and continuously so that they can all carry on a meaningful discussion concerning the displayed information. For example, during business meetings a group of executives typically sit around a conference table, an arrangement which does not readily enable information presented on the table to be displayed to all in attendance. A great benefit would be realized if a means centrally located on the table were available which would permit everyone present to examine a picture or projected data substantially simultaneously. For example, the necessity of passing among the members of the group pictures to be successively viewed would be avoided. In addition, the ability to display data through a 360° range would prevent members from looking at a series of pictures out of order, a potential problem if duplicate sets of pictures were to be provided to each individual member.

Another drawback associated with conventional display systems is that special consideration must be given to the positioning of the display within its environment because, typically, conventional display systems, such as a television, cannot be viewed from the rear or extreme sides. Thus, the area within which a viewing audience can be accommodated is limited to locations with suitable sight lines. As a result, use of the space available around the display system is often limited by the presence of blind spots. Moreover, the positioning of furniture within a room can disadvantageously be dictated by a need to provide clear sight lines to a television or the like.

In an attempt to overcome the viewing limitations associated with conventional displays, 360° viewing systems were developed, an example of which is shown in U.S. Pat. No. 3,976,837. Although such prior 360° viewing systems have provided significant advancements over the prior art, additional features have been considered desirable in order to provide a more commercially acceptable product. For example, in some applications it may be desirable to minimize the moving parts of the system.

There exists, therefore, a need for a visual display system that will enable an entire audience to view a televised picture simultaneously, regardless of an individual's location around the display system. Additionally, an improved 360° viewing system is needed which utilizes a stationary cathode ray tube and optical means to rotate a projected image in space. Such a system would preferably be of simplified construction with no moving parts, and would maximize the size of the projected image with respect to the overall physical housing for the viewing system. Moreover, a 360° viewing system is needed which provides a novel shutter arrangement that tracks the projected image in space as it is caused to rotate. The present invention fulfills these needs and provides further related advantages.

SUMMARY OF THE INVENTION

In accordance with the invention, a solid state 360° viewing system is provided for enabling a televised picture to be viewed substantially simultaneously by an audience surrounding the picture over 360°. The novel 360° viewing system utilizes a cathode ray tube (CRT) which provides a rotating image, and an optical system which projects the rotating image to create a real image in space. The 360° viewing system also utilizes a liquid crystal display (LCD) screen that encircles the rotating real image in space and functions as a multi-color filter system. The LCD screen is synchronized with rotation of the real image in space such that select panels of the LCD screen change from their normally opaque state to define a red, green or blue filtered window. The filtered window is continually redefined as the panels sequentially "open" and "close" to continuously remain in viewing alignment with the real image in space. The present invention uses no moving mechanical parts.

The 360° viewing system has a broad range of applications, including advertising marquees, television sets and display screens for presenting travel information at airports, train stations and bus depots. The present invention advantageously enables information to be communicated simultaneously to a large audience because a 360° display is presented which maximizes sight lines to the viewing system and minimizes blind spots. This feature beneficially allows great flexibility in the positioning of furniture and the viewing system within a viewing area, thereby providing greater freedom of choice in the utilization of space within the viewing area.

In accordance with a preferred form of the invention, a stationary means for creating an image, preferably a cathode ray tube (CRT), is disposed within a housing. An optical system including first and second concave mirrored surfaces, projects the image from the CRT to create a real image in space. Preferably, the optical system comprises a pair of a centrally apertured, facing parabolic mirrors disposed above the CRT, and a partially opaque plate positioned between the parabolic mirrors such that the CRT is not directly visible. The plate includes a transparent outer rim through which the first and second concave mirrored surfaces reflect light.

The image provided by the CRT is electronically rotated with an electronic image rotation system to cause the real image in space to likewise rotate. Rotation of the real image in space enables any viewer in the audience to periodically have a line of sight in alignment with a proper viewing angle for the real image in space. When the rotational rate in revolutions per minute is sufficiently great (preferably exceeding 2700 rpm), and when a suitable filter arrangement is used, all viewers surrounding the 360° viewing system will see the same picture substantially simultaneously and continuously.

The electronic rotation system utilizes a color processor circuit to separate red, green and blue (RGB) signals contained in a composite video input signal. These RGB signals are converted from an analog to a digital format and stored within a random access memory (RAM). An input address generation circuit provides the RAM with input from means for separating the composite video input signal into horizontal and vertical synchronization pulses. An output address generation circuit selects data stored in the RAM, according to an algorithm that creates a video output signal from the stored data.

An image recreated from the video output signal will appear to rotate on the CRT. To facilitate creation of the video output signal, first and second buffers are interchangeably used within the RAM such that one buffer is used to store the RGB signals while the other buffer is used in creating the video output signal. The output address generation circuit also distorts the recreated image in a manner causing the foreground to be narrower than the background.

The output address generation circuit also provides the CRT with a horizontal/vertical synchronization signal for synchronizing operation of the LCD filter system with rotation of the real image in space. Further, an RGB signal from the RAM is converted back into analog form, and sent to the CRT.

The LCD screen serves as a field sequential color generation system which enables an audience to view a colored real image in space that originates from a black and white picture formed on the CRT. The LCD panels are arranged in a uniform pattern wherein any three consecutive panels include a red filter panel, a green filter panel and a blue filter panel. Only one of the three panels becomes transparent during each revolution of the real image in space. The particular color of filter which becomes transparent corresponds with the particular RGB signal fed to the CRT for a given revolution of the real image in space.

Advantageously, the filter system provided by the LCD screen increases the visual clarity of the real image and continuously blanks out a backside/reversed view of the rotating real image in space. The window defined by the filter system is preferably smaller than the real image in space so that edges of the real image are not visible. Blurring which may be caused by viewing the edges of the rotating real image is eliminated.

A stationary transparent encasement surrounds the LCD screen. This encasement is adapted to reduce glare by utilizing tinted Plexiglas or the like, and a concave exterior encasement surface.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
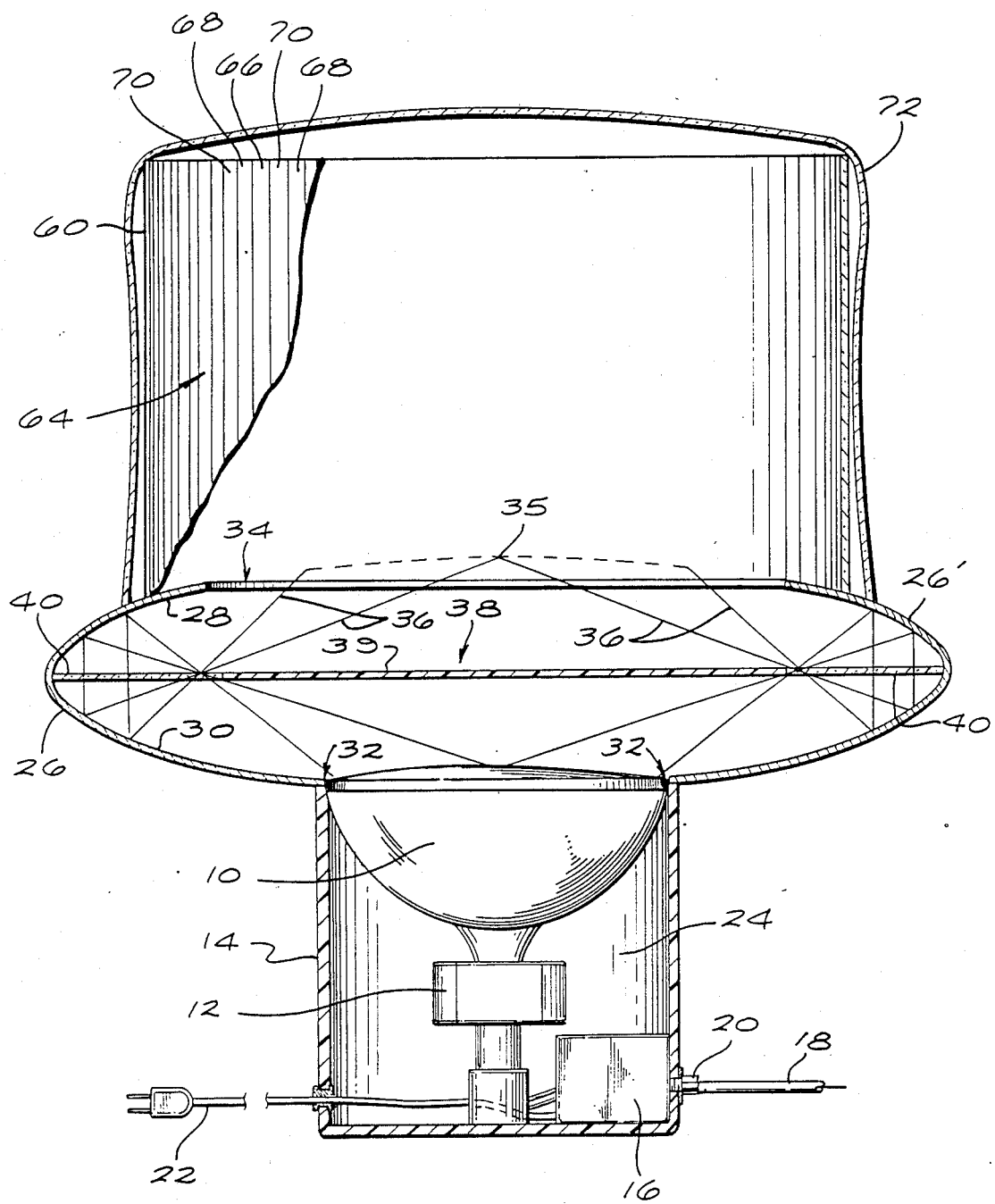
FIG. 1 is a cross-sectional view of a solid state 360° viewing system embodying the invention and taken, for reference purposes, generally along the line 1—1 of FIG. 4, illustrating the positioning of a cathode ray tube within a housing, the configuration and location of a pair of overlying, facing parabolic mirrors which create a real image in space, and a liquid crystal display (LCD) screen which defines a filtered window in synchronous alignment with the real image in space.
Figure 3:
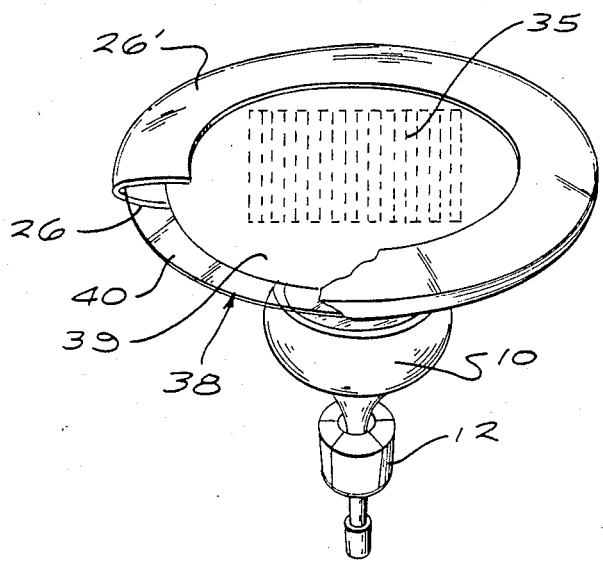
FIG. 3 is a perspective view of the 360° viewing system similar to that shown in FIG. 2, having the outer transparent encasement, the LCD screen and the housing for the cathode ray tube removed for purposes of illustration, and showing a portion of the parabolic mirrors cut away to illustrate the positioning of a partially opaque plate within the mirror arrangement.
Figure 2:
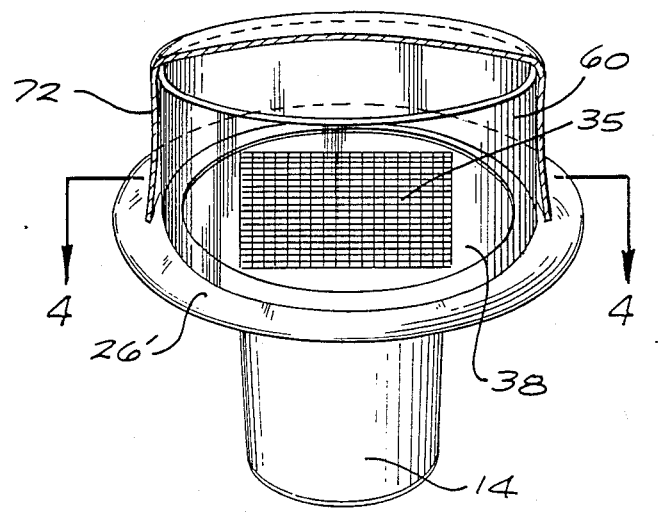
FIG. 2 is a perspective view of the solid state 360° viewing system shown in FIG. 1, illustrating an outer transparent, glare-reducing encasement presented in cross-section to further show the positioning of the LCD screen and the real image in space.

As shown in the drawings for purposes of illustration, the present invention resides in a solid state 360° viewing system which enables a televised image to be viewed substantially simultaneously by an audience surrounding the picture. The 360° viewing system includes an optical system that projects an electronically rotated image from the face of a cathode ray tube (CRT), to create a real image in space that rotates so rapidly that all of the viewers can, in effect, view the same picture substantially simultaneously and continuously. Moreover, the present invention features novel use of a liquid crystal display (LCD) screen which encases the real image in space and defines a filtered viewing window that is sequentially relocated about the LCD screen in synchronization with the electronic rotation of the image on the CRT.

The 360° viewing system of the present invention can be used in television sets, advertising marquees and in display screens for presenting travel information at airports, train stations, and bus depots. Another advantage of the solid state 360° viewing system is that it enables information to be displayed simultaneously to a large audience regardless of the positioning of the viewing system within an area, because a 360° display is provided which maximizes sight lines and minimizes blind spots caused by a misaligned orientation of a viewer with respect to the display. This feature provides greater freedom of choice in the positioning of the viewing system because, for example, furniture arrangements will no longer be dictated by sight line considerations.

In accordance with the present invention, and with reference to FIGS. 1 through 4, a stationary cathode ray tube (CRT) 10 having a magnetic yoke 12 is disposed within a housing 14. The CRT 10 receives signals for generating a television picture from electronic image rotation circuitry housed within a control box 16. The control box 16 receives a composite video input signal via a cable 18 secured to a connector 20 located on the exterior of the housing 14. A power cord 22 connects the solid state 360° viewing system to a suitable power supply. The CRT 10 is preferably vertically oriented within a chamber 24 of the housing 14, and remains stationary during operation of the system.

A pair of facing parabolic mirrors 26 and 26' (FIGS. 1 and 3), provide a first mirrored surface 28 and a second mirrored surface 30 disposed above the housing 14. The CRT 10 is aligned with apertures 32 and 34 within the lower mirror 26 and the upper mirror 26', respectively. The parabolic mirrors 26 and 26' project an image from the CRT 10 to create a real-image-in-space 35 which appears above the aperture 34. The real image in space 35 results from an optical pathway (see FIG. 1) whereby light rays 36 emanating from the CRT 10 impinge upon the first mirrored surface 28 of the mirror 26', are reflected to the second mirrored surface 30 of the mirror 26, and then are focused above the aperture 34 to form the real image in space 35. The real image in space 35 is "right reading," in that an image reversed by the first mirrored surface 28 is reversed back again by the second mirrored surface 30 so that the real image in space is virtually identical to the original image created on the CRT 10.

The parabolic mirrors 26 and 26' may be formed of any desired material, such as a polished metal, "silvered" materials, glass or any other highly reflective surface. Although the parabolic mirror arrangement shown is preferred, any other optical system capable of forming a real image in space may be used. The exact location of the real image in space 35 with respect to the aperture 34 through the upper mirror 26', is a function of the spacing between the mirrored surfaces 28 and 30, and their respective curvatures.

The real image in space 35 is preferably viewed at an angle of approximately 30 degrees. The optimum viewing angle is determined by the magnification provided by the optical system. In the preferred embodiment, the parabolic mirrors 26 and 26' are designed to magnify the CRT image by a factor of four.

A plate 38 is positioned within the facing mirror arrangement between the CRT 10 and the aperture 34. The plate 38 includes an opaque portion 39 which is at least as large as the face of the CRT 10. This opaque portion 39 of the plate 38 is provided to ensure that the CRT 10 will not be directly visible as an audience views the real image in space 35. The plate 38 further includes a transparent rim portion 40 through which the light rays 36 can pass as they travel along the above-discussed optical pathway.

The image formed on the CRT 10 is electronically rotated by an electronic image rotation system that imparts to the image a stepped spin movement (see FIG. 4) which occurs so fast that the image appears to be rotating continuously. Circuitry comprising the electronic image rotation system is housed within the control box 16. Rotation of the image upon the face of the CRT 10 causes the real image in space 35 to rotate as well. When the real image in space 35 is rotated at a speed of at least 2700 revolutions per minute, each viewer in a circle surrounding the solid state 360° viewing system will see the real image in space 35 periodically, and due to the rapid rotation and use of a suitable filter system (to be discussed below), all of the viewers surrounding the 360° viewing system can, in effect, view the same picture substantially simultaneously and continuously.

Figure 4:
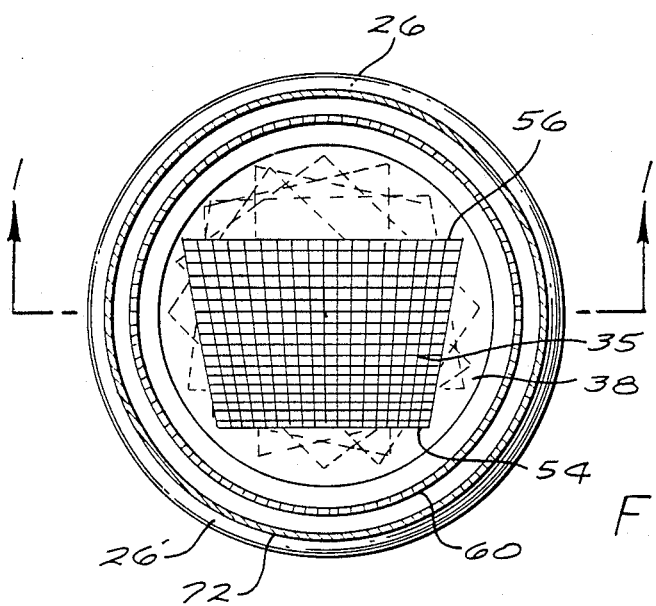
FIG. 4 is a cross-sectional plan view taken generally along the line 4—4 of FIG. 2, illustrating the step-wise rotation of the real image in space and the magnitude of image distortion.

The electronic image rotation system electronically rotates the image upon the face of the CRT 10 after processing a composite input video signal into a separated format of red, green, and blue signals, and horizontal and vertical synchronization pulses. The image rotation system makes the image displayed by the CRT 10 appear to rotate by electronically storing the separated synchronization pulses and color data of the video input signal in a random access memory, and then processing the stored data to generate the image on the CRT 10 at various angles of rotation as schematically illustrated in FIG. 4.

Figure 5:
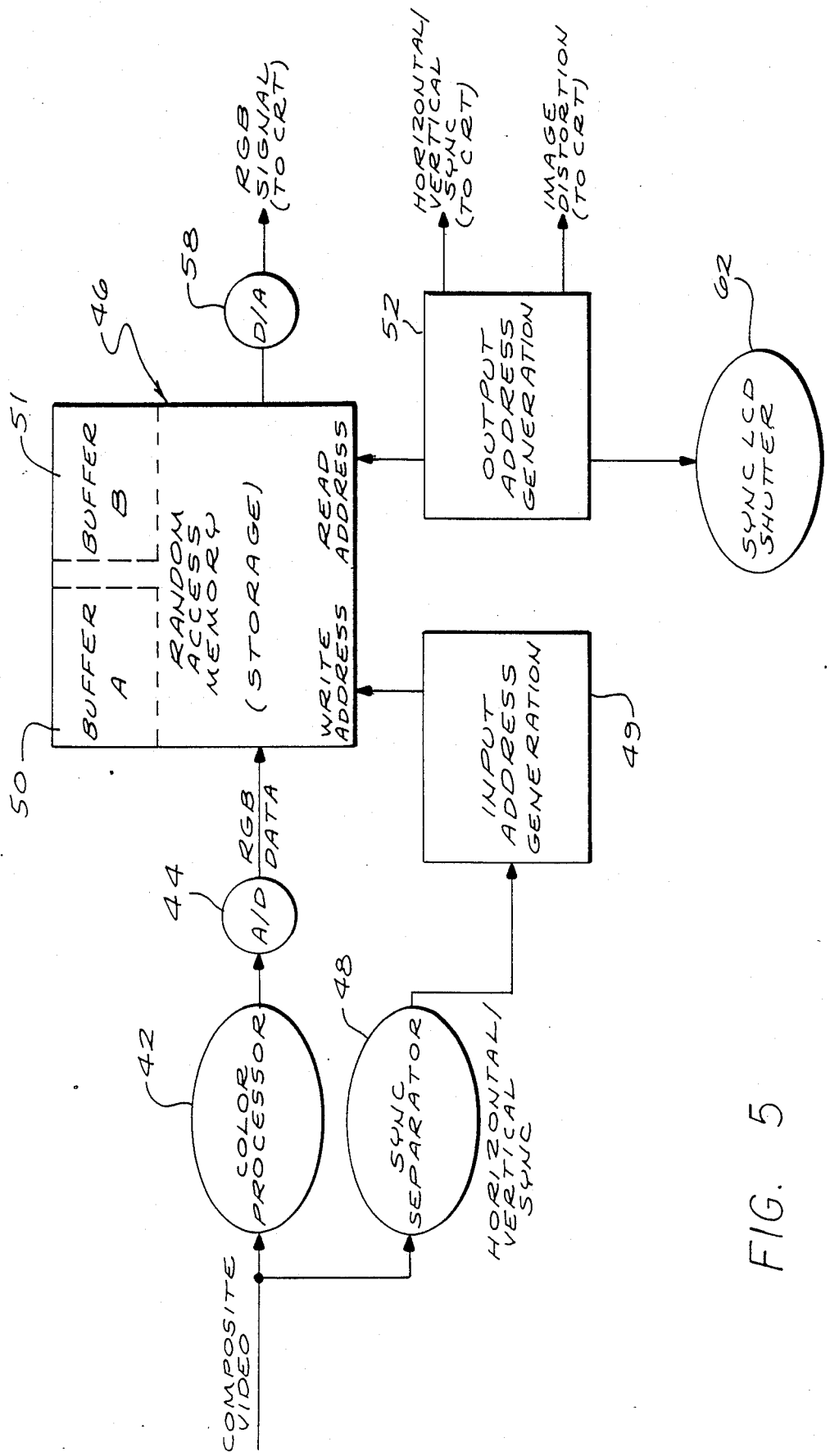
FIG. 5 is a logic diagram illustrating the processing of a composite video signal to create a stepped-rotating real image in space which moves in synchronization with a window on the LCD screen.

Referring now to the diagram of the image rotation system shown in FIG. 5, a color processor circuit 42 separates red, green and blue image data contained in the composite video input signal. These analog signals are converted to a digital format by an analog to digital converter 44. After being converted to a digital format, the red, green and blue image data is stored in a random access memory (RAM) 46. The composite video input signal is also separated into horizontal and vertical synchronization pulses by a sync separator circuit 48. The horizontal and vertical synchronization pulses provide input to an input address generation circuit 49, which dictates how digital information from the converter 44 is stored within the RAM 46.

The RAM 46 creates a buffer A 50 and a buffer B 51 which are alternately used for receiving/storing the incoming video signal and creating an outgoing rotated video signal. The digital red, green and blue image data is stored in the buffer A 50 while the buffer B 51 is used in creating the rotated video output signal. After the buffer A has been used for storage and the rotated output signal has been created in buffer B, the buffers A and B are interchanged in use such that color image data is stored in the buffer B while the buffer A is used in creating the rotated output signal. The buffers A and B alternate functions in this manner continuously. To facilitate the storage of received data in the RAM 46, the input address generation circuit 49 resets at the beginning of each video frame to select an initial, predetermined RAM location in either the buffer A or the buffer B for storage. This reset action is timed to coincide with every other vertical synchronization pulse inputted by the sync separator circuit 48 to the input address generation circuit 49.

An output address generation circuit 52 selects data stored in the RAM 46 accordingly to an algorithm which recreates a video output signal from the stored data. The output address generation circuit 52 electronically rotates the input image in a stepped fashion. This stepped rotation occurs at a sufficiently rapid rate (approximately 2,700 rpm) so that the human eye would only perceive continuous movement. The output address generation circuit 52 also utilizes the algorithm to distort the rotated video output signal such that a foreground edge 54 of the real image 35 projected from the CRT will be narrower than a background edge 56 (FIG. 4). This has the effect of creating an optical illusion which makes a horizontal real image in space appear to be tilted vertically. The output address generation circuit 52 sends to the CRT 10 the rotated, distorted video output signal as well as a horizontal/vertical synchronization signal, in stepped pulses.

The CRT 10 receives red, green and blue (RGB) signals from the RAM 46 via a digital to analog converter 58. The RGB signal from the converter 58 to the CRT 10 is a field sequential black and white signal. The field sequential signal from the converter 58 alternates between red-field content, green-field content and blue-field content signals in a uniform manner. The field of the black and white signal from the converter 58 changes with each complete rotation of the real image in space 35, so that every third rotation of the real image in space, the same color-field is presented. The color content of the black and white field sequential signal to the CRT 10 corresponds with operation of a filter system provided by a liquid crystal display (LCD) screen 60.

The LCD screen 60 continuously presents a filtered viewing window appropriate for manifesting the color content of the black and white signal generated by the converter 58. The LCD screen 60 will, for example, provide a red filtered window as a red-content black and white signal is used to create an image on the CRT 10, so that the red content of the real image in space 35 will be visible to the viewers. The same is true as a green-content signal is used (i.e., a green filtered window is provided), as well as with a blue-content signal. The matching of the color of filter provided by the LCD window with the color content of the input signal, as well as the synchronization of the viewing window's location with the rotation of the real image in space 35, is provided by a sync LCD shutter circuit 62 which receives input from the output address generation circuit 52. This operational feature of the LCD screen 60 enables an audience to view a colored real image in space 35 that originates from a black and white image displayed on the CRT 10.

The LCD screen 60 encircles the real image in space 35 and is disposed atop the parabolic mirrors 26 and 26'. The LCD screen 60 includes a plurality of normally opaque LCD panels 64, each adapted to change from opaque to a red filter, green filter or blue filter. These LCD panels 64 are arranged in a pattern such that any three consecutive panels will include a red filter panel, a green filter panel and a blue filter panel ordered such that the same color filter will appear every third panel about the LCD screen 60. Preferably, the pattern has each red filter panel 66 (FIG. 1) followed by a green filter panel 68, which in turn is followed by a blue filter panel 70. This pattern repeats itself about the LCD screen 60 in the same direction that the real image in space 35 rotates. The LCD panels 64 are ordered in FIG. 1 to correspond to clockwise rotation of the real image in space 35.

The LCD screen 60 is activated to function as a field sequential color generation filter system in coordination with the field sequential RGB signal from the converter 58. The red filter panels 66 sequentially change from opaque to a transparent red filter during a red cycle to define a moving window for viewing the red content of the real image in space 35. The sequential activation of the red filter panels 66 causes the viewing window to be continuously redefined about the LCD screen 60 in synchronization with one rotation of the real image in space so that the viewing window is continuously aligned therewith. Since only a select number of LCD panels 64 are utilized at any one moment in presenting the window, those LCD panels not defining the window at a given instant become or remain opaque such that the LCD screen 60 continuously blanks out a backside/reversed view of the rotating real image in space 35.

Similarly, the green filter panels 68 sequentially change from opaque to a transparent green filter during a green cycle to define a moving window for viewing the green content of the real image in space 35. This process is repeated with the blue filters.

The color cycles alternately occur one at a time with no overlap, preferably timed such that execution of a color cycle is done in sync with one complete rotation of the real image in space. Thus, each color cycle will occur each third revolution of the real image in space 35. In the preferred mode of operation, each color cycle will occur at least 900 times per minute.

Advantageously, the filter system provided by the LCD screen 60 increases the visual clarity of the real image in space 35. This is because the viewing widow defined by the LCD panels 64 is narrower than the real image in space 35 so that edges of the real image in space are not normally visible. This practice eliminates blurring which would otherwise be caused by viewing the edges of the real image in space, in motion.

A stationary transparent encasement 72 encloses the LCD screen 60. The encasement 72 is preferably manufactured of Plexiglas and is adapted to reduce glare by, for example, the provision of tinting and/or a concave exterior surface.

The 360° viewing system of the present invention can be placed in a central location, such as on top of a conference table, about which are seated a number of persons who wish to view a picture. As the electronic image rotation system electronically rotates an image upon the CRT 10 at a rate greater than 2700 revolutions per minute, the optical system projects the rotating image to create the rotating real image in space 35. The rapid rotational rate in synchronization with operation of the field sequential color generation system, results in each viewer seeing the picture clearly and distinctly each time that it is aligned with the viewer's line of sight so that in effect, an entire group of gathered persons can view the same picture simultaneously.

From the foregoing, it will be appreciated that the solid state 360° viewing system of the present invention advantageously enables a single image to be viewed substantially simultaneously by a group of viewers located 360° around the system without requiring any moving mechanical parts. Moreover, the 360° viewing system advantageously utilizes a filter system which causes a black and white image to be viewed as a colored real image in space, while increasing the visual clarity thereof.

While a particular form of the invention has been illustrated and described, it will be apparent that various modifications can be made without departing from the spirit and scope of the invention. Accordingly, it is not intended that the invention be limited, except as by the appended claims.

We claim:

1. A 360° viewing system, comprising:
an optical system for continuously projecting a real image in space;
means for rotating the real image in space at a given number of revolutions per minute;
a field sequential color generation system encircling the real image in space, the field sequential color generation system comprising a plurality of red filters, green filters and blue filters, the red filters being sequentially activated during a red cycle to define a viewing window through which the real image in space can be viewed, the green filters being sequentially activated during a green cycle to similarly define a viewing window, and the blue filters being sequentially activated during a blue cycle to define a viewing window, wherein the red, green and blue cycles alternately occur to continuously redefine the viewing window about the color generation system in synchronization with rotation of the real image in space such that the real image in space can be continuously viewed in color through the color generation system; and
means for synchronizing the red, green and blue cycles with the rotation of the real image in space.

2. A system as set forth in claim 1, wherein the red, green and blue cycles each occur every third rotation of the real image in space.

3. A system as set forth in claim 1, wherein the real image in space is rotated at at least 2700 revolutions per minute.

4. A system as set forth in claim 1, wherein the optical system includes means for creating a black and white image to be projected as the real image in space.

5. A system as set forth in claim 4, wherein the means for creating a black and white image includes a stationary cathode ray tube, and wherein the image created thereon is rotated electronically.

6. A system as set forth in claim 4, wherein the means for creating a black and white image is positioned within a housing.

7. A system as set forth in claim 1, wherein the field sequential color generation system continuously blanks out a backside reversed view of the rotating real image in space.

8. A system as set forth in claim 1, wherein the field sequential color generation system is positioned within a reduced glare transparent encasement.

9. A system as set forth in claim 1, wherein the field sequential color generation system includes a plurality of normally opaque liquid crystal display (LCD) panels, each adapted to change from opaque to a red, green or blue filter, wherein the LCD panels are arranged such that any three consecutive LCD panels will include a red filter, a green filter and a blue filter.

10. A system as set forth in claim 9, wherein the LCD panels are arranged about the color generation system in the same direction that the real image in space rotates, in a repeating pattern of a red panel, followed by a green panel, which is followed by a blue panel, and so forth.

11. A system as set forth in claim 1, wherein the optical system includes facing first and second concave mirrored surfaces.

12. A system as set forth in claim 11, wherein the first and second mirrored surfaces are provided by a pair of parabolic mirrors disposed above a stationary cathode ray tube.

13. A system as set forth in claim 12, wherein the real image in space is projected above the pair of parabolic mirrors.

14. A system as set forth in claim 12, wherein a partially opaque plate is disposed between the cathode ray tube and the real image in space such that the cathode ray tube is not visible when viewing the real image in space.

15. A system as set forth in claim 14, wherein the opaque plate is positioned between the pair of parabolic mirrors and includes a transparent outer rim through which the first and second mirrored surfaces reflect light to create the real image in space.

16. A 360° viewing apparatus, comprising:
means for creating an image;
a pair of facing parabolic mirrors configured for projecting the image to create a real image in space;
means for rotating the real image in space; and
means for causing the real image in space to be viewed intermittently each revolution thereof by any one viewer about the 360° viewing system, such that all viewers will see the same real image in space substantially simultaneously and continuously.

17. An apparatus as set forth in claim 16, wherein the means for creating an image includes a cathode ray tube situated adjacent to at least one of the parabolic mirrors.

18. An apparatus as set forth in claim 17, wherein the cathode ray tube is stationary and the image provided thereon is rotated electronically.

19. An apparatus as set forth in claim 18, wherein the real image in space is rotated at a rate of at least 2700 revolutions per minute.

20. An apparatus as set forth in claim 19, wherein a partially opaque plate is disposed between the cathode ray tube and the real image in space such that the cathode ray tube is not directly visible when viewing the real image in space.

21. An apparatus as set forth in claim 16, wherein the means for causing the real image in space to be viewed intermittently includes a normally opaque liquid crystal display (LCD) screen which encircles the real image in space, wherein the LCD screen presents a transparent viewing window through which the real image in space can be viewed, wherein the viewing window is continuously redefined about the LCD screen in synchronization with rotation of the real image in space such that the viewing window is continually aligned with the real image in space.

22. An apparatus as set forth in claim 21, wherein the LCD screen is positioned within a reduced-glare transparent encasement.

23. An apparatus as set forth in claim 21, wherein the LCD screen includes a plurality of normally opaque LCD panels adapted to change from opaque to red filters, green filters and blue filters.

24. An apparatus as set forth in claim 23, wherein the creating means provides a black and white image, and wherein the red, green and blue filters cause the real image in space to be viewed in color.

25. An apparatus as set forth in claim 24, wherein the red filters are sequentially activated during a red cycle to define the viewing window, the green filters are sequentially activated during a green cycle to define the viewing window, and the blue filters are sequentially activated during a blue cycle to define the viewing window, wherein each cycle corresponds to at least one rotation of the real image in space, and wherein the red, green and blue cycles occur alternately to continuously redefine the viewing window about the LCD screen in synchronization with the rotation of the real image in space.

26. A 360° viewing apparatus, comprising:
a cathode ray tube for creating an image;
an electronic image rotation system for electronically rotating the image on the cathode ray tube, the image rotation system including:
a color processor circuit for separating red, green and blue signals contained in a composite video input signal,
analog to digital conversion means for converting the red, green and blue signals from an analog to a digital format,
random access memory means for storing digital red, green and blue image data,
an output address generation circuit which selects data stored in the random access memory means according to an algorithm that creates a rotated video output signal from the stored image data such that an image recreated from the rotated video output signal will appear rotated from a stored image, and
digital to analog conversion means for converting the digital red, green and blue image data to an analog format for input to the cathode ray tube; and
an optical system for continuously projecting the image created on the cathode ray tube to form a real image in space, wherein rotation of the image on the cathode ray tube causes the real image in space to rotate in synchronization therewith and wherein the image rotation system electronically rotates the image on the cathode ray tube at a given number of revolutions per minute, such that a plurality of viewers surrounding the viewing apparatus will each see the real image in space a number of times every minute corresponding to the given number of revolutions per minute, the given number of revolutions per minute being sufficient to permit all viewers to see the same image substantially simultaneously and continuously.

27. An apparatus as set forth in claim 26, wherein the output address generation circuit selects stored data according to an algorithm that creates a video output signal from the stored data, such that an image recreated from the video output signal will be distorted so that the foreground of the recreated image will be narrower than the background.

28. An apparatus as set forth in claim 26, wherein the given number of revolutions per minute is at least 2700.

29. An apparatus as set forth in claim 26, wherein the image rotation system further includes an input address generation circuit which selects a location for storing the digital red, green and blue image data within the random access memory means.

30. An apparatus as set forth in claim 29, further including a separator circuit for separating the composite video input signal into horizontal and vertical synchronization pulses for the input address generation circuit.

31. An apparatus as set forth in claim 29, wherein the random access memory means provides first and second buffers which are alternately used to receive the video input signal and create the rotated video output signal.

32. An apparatus as set forth in claim 31, wherein the input address generation circuit resets to select a location in either the first or the second buffer at the beginning of each video frame, every other vertical synchronization pulse.

33. An apparatus as set forth in claim 26, wherein the optical system includes a normally opaque liquid crystal display (LCD) screen which encircles the real image in space, wherein the LCD screen presents a transparent viewing window through which the real image in space can be viewed, wherein the viewing window is continuously redefined around the LCD screen in synchronization with rotation of the real image in space.

34. An apparatus as set forth in claim 33, wherein the LCD screen includes a plurality of normally opaque LCD panels each adapted to change from opaque to a red filter, a green filter or a blue filter.

35. An apparatus as set forth in claim 34, wherein a black and white image is created by the cathode ray tube and wherein the red, green and blue filters cause a black and white real image in space to be viewed in color.

36. An apparatus as set forth in claim 34, wherein the red filters are sequentially activated during a red cycle to define the viewing window, the green filters are sequentially activated during a green cycle to define the viewing window, and the blue filters are sequentially activated during a blue cycle to define the viewing window, wherein each cycle corresponds to at least one rotation of the real image in space, and wherein the red, green and blue cycles occur alternately to continuously redefine the viewing window about the LCD screen in synchronization with the rotation of the real image in space.

37. An apparatus as set forth in claim 26, wherein the optical system includes first and second concave mirrored surfaces, the second mirrored surface being spaced from the first mirrored surface on the concave side thereof and being concave toward the first mirrored surface, wherein the first mirrored surface includes an aperture for projecting the real image therethrough, and wherein the second mirrored surface includes an aperture through which the image is directed from the cathode ray tube to the first mirrored surface.

38. An apparatus as set forth in claim 37, wherein the first and second mirrored surfaces are provided by a pair of facing parabolic mirrors disposed above the cathode ray tube.

39. An apparatus as set forth in claim 37, including a partially opaque plate disposed between the cathode ray tube and the aperture in the first mirrored surface, such that the cathode ray tube is not directly visible when viewing the real image in space.

40. An apparatus as set forth in claim 34, wherein the LCD panels are arranged such that any three consecutive LCD panels include a red filter panel, a green filter panel and a blue filter panel.

41. An apparatus as set forth in claim 40, wherein the LCD panels are arranged about the LCD screen in the same direction that the real image rotates, in a repeating pattern of a red filter panel, followed by a green filter panel, which is followed by a blue filter panel.

42. A 360° viewing apparatus, comprising:
a cathode ray tube (CRT) for creating an image;
first and second facing concave mirrored surfaces for projecting a real image in space that corresponds to the image created by the CRT;
means for rotating the real image in space;
a field sequential color generation system encircling the real image in space, the field sequential color generation system comprising a plurality of red filters, green filters and blue filters, the red filters being sequentially activated during a red cycle to define a viewing window through which the real image in space can be viewed, the green filters being sequentially activated during a green cycle to similarly define a viewing window, and the blue filters being sequentially activated during a blue cycle to define a viewing window, wherein the red, green and blue cycles alternately occur to continuously redefine the viewing window about the color generation system in synchronization with rotation of the real image in space such that the real image in space can be continuously viewed in color through the color generation system; and means for synchronizing the red, green and blue cycles with the rotation of the real image in space.

43. An apparatus as set forth in claim 42, wherein the real image in space is rotated at least 2700 revolutions per minute.

44. An apparatus as set forth in claim 42, wherein the field sequential color generation system is positioned within a transparent encasement which is adapted to reduce glare.

45. An apparatus as set forth in claim 42, wherein the first mirrored surface includes an aperture for projecting the real image in space therethrough, and wherein the second mirrored surface includes an aperture through which the image is directed from the CRT to the first mirrored surface.

46. An apparatus as set forth in claim 45, wherein the first and second mirrored surfaces are provided by a pair of parabolic mirrors disposed above the CRT.

47. An apparatus as set forth in claim 46, including a partially opaque plate disposed between the CRT and the aperture in the first mirrored surface, such that the CRT is not directly visible when viewing the real image in space.

48. An apparatus as set forth in claim 47, wherein the partially opaque plate includes a transparent outer rim through which the first and second mirrored surfaces reflect light to create the real image in space.

49. An apparatus as set forth in claim 42, wherein the real image in space is electronically rotated without moving mechanical parts.

50. An apparatus as set forth in claim 42, wherein the field sequential color generation system continuously blanks out a backside reversed view of the rotating real image in space.

51. An apparatus as set forth in claim 42, wherein the real image in space is rotated at a given number of revolutions per minute, and wherein the red, green and blue cycles each occur every third revolution.

52. An apparatus as set forth in claim 42, wherein the field sequential color generation system includes a plurality of normally opaque liquid crystal display (LCD) panels, each adapted to change from an opaque state to a colored transparent state.

53. An apparatus as set forth in claim 52, wherein the LCD panels are arranged such that any three consecutive LCD panels will include a red filter, a green filter and a blue filter.

54. An apparatus as set forth in claim 42, wherein the means for rotating the real image in space includes an electronic image rotation system for electronically rotating the image on the cathode ray tube, the image rotation system including:

a color processor circuit for separating red, green and blue signals contained in a composite video input signal;

analog to digital conversion means for converting the red, green and blue signals from an analog to a digital format;

random access memory means for storing digital red, green and blue image data;

an output address generation circuit which selects data stored in the random access memory means according to an algorithm that creates a rotated video output signal from the stored image data such that an image recreated from the rotated video output signal will appear rotated from a stored image; and digital to analog conversion means for converting the digital red, green and blue image data to an analog format for input to the cathode ray tube.

55. A method of presenting an image to an audience generally surrounding the image, such that all viewers see the same image substantially simultaneously, the steps comprising:

providing an image;

projecting the image to create a real image in space;

rotating the real image in space at a given number of revolutions per minute; and presenting a window in a normally opaque shutter system surrounding the rotating real image in space, and rotating the window about the shutter system in synchronization with rotation of the real image such that the window is continually aligned with the rotating real image in space.

56. A method as set forth in claim 55, wherein the image rotates at a rate of at least 2700 revolutions per minute.

57. A method as set forth in claim 55, wherein the step of projecting the image includes the steps of reflecting the image from a concave first mirrored surface and onto a facing concave second mirrored surface, and reflecting the image from the second mirrored surface to project a real image in space through an aperture in the first mirrored surface.

58. A method as set forth in claim 55, wherein the step of presenting a window includes:

sequentially changing a plurality of filter panels from opaque to red filters during a red cycle to define the window;

sequentially changing a plurality of filter panels from opaque to green filters during a green cycle to define the window; and sequentially changing a plurality of filter panels from opaque to blue filters during a blue cycle to define the window;

wherein only one color cycle occurs at a time, with the red, green and blue cycles alternately occurring to continuously redefine the window about the shutter system in synchronization with rotation of the real image in space.

59. A method as set forth in claim 58, wherein the red, green and blue cycles each occur every third revolution of the real image in space.

60. A method as set forth in claim 58, wherein the step of providing an image includes creating a black and white image on a cathode ray tube which, together with the red, green and blue panels, causes the real image in space to be viewed in color.

61. A method as set forth in claim 55, wherein the step of providing the image includes creating the image on a cathode ray tube (CRT) and electronically rotating the image thereon.

62. A method as set forth in claim 61, wherein the step of electronically rotating the image includes:
   separating red, green and blue signals contained in a composite video input signal;
   converting the red, green and blue signals from an analog to a digital format;
   storing the digital red, green and blue signals in a random access memory;
   selecting signal data stored in the random access memory according to an algorithm that creates a rotated video output signal from the stored signal data such that an image recreated from the rotated video output signal will appear to be rotated in comparison with a stored image;
   converting stored red, green and blue signal data from a digital to an analog format; and
   inputting analog red, green and blue signal data and the rotated video output signal to the CRT.

63. A method as set forth in claim 62, wherein the step of storing the signals in a random access memory includes:
   creating first and second buffers in the random access memory;
   storing the digital red, green and blue signals in the first buffer while creating the rotated video output signal in the second buffer; and
   storing the digital signals in the second buffer while creating the rotated video output signal in the first buffer after the first buffer has been used for storage and the second buffer has been used for creating a rotated output signal, whereby the buffers are interchangeably used and the first and second buffers alternate in this manner continuously.

64. A method as set forth in claim 62, further including the step of selecting stored signal data according to an algorithm that causes the rotated video output signal to be distorted from the stored image such that the foreground of the recreated image will be narrower than the background.

65. A method of presenting an image to an audience generally surrounding the image such that all viewers see the same image substantially simultaneously, the steps comprising:
   forming a black and white real image in space;
   rotating the real image in space; and
   presenting a transparent window in a normally opaque filter system surrounding the rotating real image in space, and rotating the window about the filter system in synchronization with rotation of the real image in space such that the window is continually aligned with the rotating real image in space.

66. A method as set forth in claim 65, wherein the real image in space rotates at a rate of at least 2700 revolutions per minute.

67. A method as set forth in claim 65, including the step of filtering the real image in space through the transparent window to cause the real image in space to be displayed in color.

68. A method as set forth in claim 67, wherein the step of filtering the real image in space includes:
   a. sequentially changing select portions of the filter system from opaque to a red filter window during a red cycle;
   b. sequentially changing select portions of the filter system from opaque to a green filter window during a green cycle;
   c. sequentially changing select portions of the filter system from opaque to a blue filter window during a blue cycle; and
   d. continuously repeating steps a–c to present the real image in space in a color format.

69. A method as set forth in claim 68, including the steps of:
   generating a black and white real image in space from a red-content video signal;
   synchronizing occurrence of the red cycle with use of the red-content video signal to manifest the red content of the real image in space;
   generating a black and white real image in space from a green-content video signal;
   synchronizing occurrence of the green cycle with use of the green-content video signal to manifest the green content of the real image in space;
   generating a black and white real image from a blue-content video signal; and
   synchronizing occurrence of the blue cycle with use of the blue content video signal to manifest the blue-content of the real image in space.

70. A method as set forth in claim 69, wherein a red, green and blue cycle is completed every third rotation of the real image in space.

71. A method as set forth in claim 69, wherein the red, green and blue cycles each occur at least 900 times per minute.

72. A method of presenting an image to an audience generally surrounding the image such that all viewers see the same image substantially simultaneously, the steps comprising:
   intercepting light emanating from means for providing a televised image with a first concave mirrored surface;
   reflecting the light onto a second concave mirrored surface, thereby projecting the light to a point of convergence and forming a real image in space; and
   electronically rotating the televised image upon the means for providing said televised image such that the real image in space rotates a given number of revolutions per minute that is sufficient to permit all viewers to see the same image substantially simultaneously and continuously.

73. A method as set forth in claim 72, further including the step of presenting a filtered transparent window in a normally opaque filter system surrounding the rotating real image in space, and rotating the window about the filter system in synchronization with rotation of the real image in space such that the window is continually aligned with the rotating real image in space.

74. A method as set forth in claim 72, wherein the step of presenting a filtered window includes maintaining an opaque portion of the filter system to continuously blank out a backside reversed view of the real image in space.

75. A method as set forth in claim 72, further including the step of obscuring the means for providing a televised image such that said means is not directly visible while viewing the real image in space.

76. A method of presenting an image to an audience generally surrounding the image such that all viewers see the same image substantially simultaneously, the steps comprising:
   separating red, green and blue signals contained in a composite video input signal;

storing the red, green and blue signals in a random access memory (RAM);

selecting signal data stored in the RAM according to an algorithm that creates a rotated video output signal from the stored signal such that an image recreated from the rotated video output signal will appear to be rotated in comparison with a stored image;

inputting red, green and blue signal data and the rotated video output signal to a cathode ray tube (CRT), thereby electronically rotating, in stepped increments, an image created by the CRT at a given number of revolutions per minute; and projecting the rotating image to create a real image in space rotating so rapidly that all viewers see the same real image in space substantially simultaneously and continuously.

77. A method as set forth in claim 76, wherein the step of storing includes converting the red, green and blue signals from an analog to a digital format, and wherein the step of inputting the red, green and blue signal data to the CRT includes converting the data from a digital to an analog format.

78. A method as set forth in claim 76, including the step of distorting the rotated video output signal such that the foreground of the real image in space will be narrower than the background.

79. A method as set forth in claim 76, wherein the step of storing the signals in the RAM includes;

creating first and second buffers in the RAM;

storing the red, green and blue signals in the first buffer while creating the rotated video output signal in the second buffer; and storing the signals in the second buffer while creating the rotated video output signal in the first buffer after the first buffer has been used for storage and the second buffer has been used for creating a rotated output signal, whereby the buffers are interchangeably used, the first and second buffers alternating in this manner continuously.

80. A method as set forth in claim 76, wherein the step of projecting the rotating image to create a real image in space includes:

intercepting light rays emanating from the CRT with a first concave mirrored surface; and reflecting the light rays onto a facing second concave mirrored surface which then projects the light rays to a point of convergence and forms the real image in space.

81. A method as set forth in claim 76, further including the step of presenting a window in a normally opaque shutter system surrounding the rotating real image in space and rotating the window about the shutter system in synchronization with rotation of the real image in space such that the window is continually aligned with the rotating real image in space.

82. A method as set forth in claim 81, wherein the step of presenting a window includes:

sequentially changing a plurality of filter panels from opaque to red filters during a red cycle to define the window;

sequentially changing a plurality of filter panels from opaque to green filters during a green cycle to define the window; and sequentially changing a plurality of filter panels from opaque to blue filters during a blue cycle to define the window;

wherein the red, green and blue cycles occur alternately, each during at least one revolution of the real image in space, to continuously redefine the window about the shutter system in synchronization with rotation of the real image in space.

83. A method as set forth in claim 82, wherein the step of inputting red, green and blue signal data to the CRT includes inputting red signal data during a red cycle, inputting green signal data during a green cycle, and inputting blue signal data during a blue cycle, wherein only one color cycle occurs at a time.

* * * * *